(12) United States Patent
Ware et al.

(10) Patent No.: US 11,947,474 B2
(45) Date of Patent: *Apr. 2, 2024

(54) MULTI-MODE MEMORY MODULE AND MEMORY COMPONENT

(71) Applicant: Rambus Inc., San Jose, CA (US)

(72) Inventors: Frederick A. Ware, Los Altos Hills, CA (US); John Eric Linstadt, Palo Alto, CA (US); Kenneth Lee Wright, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,838

(22) Filed: Jun. 2, 2022

(65) Prior Publication Data

US 2022/0382691 A1 Dec. 1, 2022

Related U.S. Application Data

(63) Continuation of application No. 16/942,380, filed on Jul. 29, 2020, now Pat. No. 11,379,392, which is a continuation of application No. 15/808,595, filed on Nov. 9, 2017, now Pat. No. 10,762,010.

(60) Provisional application No. 62/423,148, filed on Nov. 16, 2016.

(51) Int. Cl.
*G06F 13/00* (2006.01)
*G06F 13/16* (2006.01)
*G06F 13/28* (2006.01)

(52) U.S. Cl.
CPC ...... *G06F 13/1673* (2013.01); *G06F 13/1678* (2013.01); *G06F 13/28* (2013.01)

(58) Field of Classification Search
CPC ... G06F 13/1673; G06F 13/1678; G06F 13/28
See application file for complete search history.

(56) References Cited

U.S. PATENT DOCUMENTS

| | | |
|---|---|---|
| 2003/0110344 A1 | 6/2003 | Szczepanek et al. |
| 2006/0212760 A1 | 9/2006 | Swoboda |
| 2009/0235020 A1* | 9/2009 | Srinivasan .......... G06F 12/0607 711/E12.078 |

(Continued)

FOREIGN PATENT DOCUMENTS

| | | |
|---|---|---|
| WO | WO-2016-089563 A1 | 6/2016 |
| WO | WO-2016-099665 A1 | 6/2016 |
| WO | WO-2016-145328 A2 | 9/2016 |

*Primary Examiner* — Craig S Goldschmidt
(74) *Attorney, Agent, or Firm* — Fenwick & West LLP

(57) ABSTRACT

A memory module comprises an address buffer circuit, a command/address channel, and a plurality of memory components controlled by the address buffer circuit via the command/address channel. At least one memory component comprises a plurality of data ports, a memory core to store data, and a data interface. The data interface is capable of transferring data between the memory core and the data ports. The data interface supports a first data width mode in which the data interface transfers data at a first bit width and a first burst length via the data ports. The data interface also supports a second data width mode in which the data interface transfers data at a second bit width and second burst length via the data ports. The first bit width is greater than the second bit width and the first burst length is shorter than the second burst length.

11 Claims, 10 Drawing Sheets

(56) References Cited

U.S. PATENT DOCUMENTS

2013/0033954 A1* 2/2013 Shaeffer ............... G06F 3/0659
                                                    365/230.03
2017/0270017 A1   9/2017 Li

* cited by examiner

_(1)_

MULTI-MODE MEMORY MODULE AND MEMORY COMPONENT

CROSS REFERENCE TO RELATED APPLICATION

This application is a continuation of U.S. patent application Ser. No. 16/942,380 filed on Jul. 29, 2020 which is a continuation of U.S. patent application Ser. No. 15/808,595 filed on Nov. 9, 2017 which claims the benefit of U.S. Provisional Patent Application No. 62/423,148 filed on Nov. 16, 2016, each of which are incorporated by reference herein in its entirety.

BACKGROUND

A computer motherboard can include several memory slots for memory modules. Different motherboards can use different memory channel topologies to provide signals to the memory slots. Examples of memory channel topologies include point to point and multi-drop topologies.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles, or benefits touted, of the techniques described herein.

Figure 1:
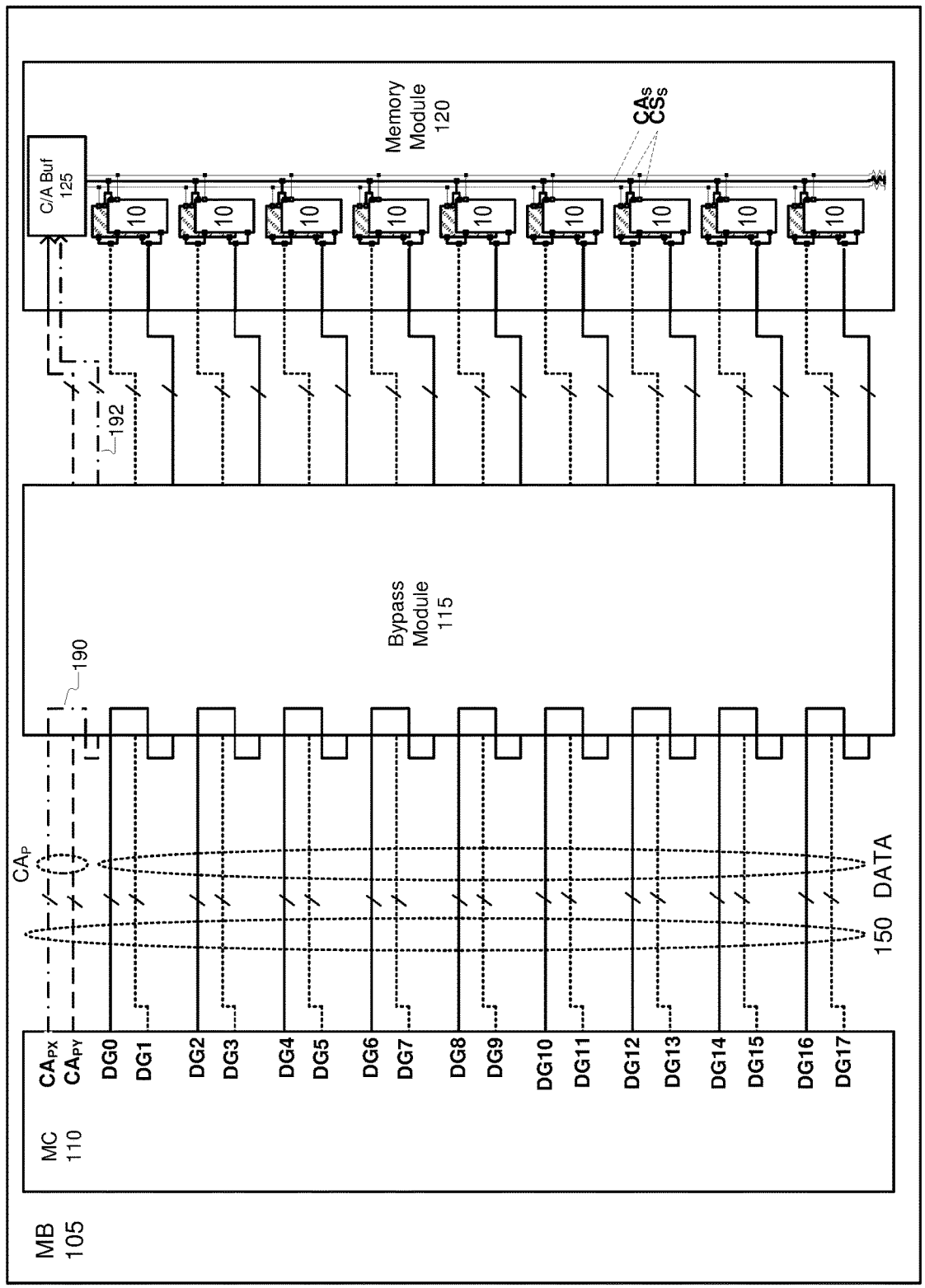
FIG. 1 is a computing system with one bypass module and one memory module, according to an embodiment.

FIG. 1 is a computing system with one bypass module and one memory module, according to an embodiment. Computing system 100 may be a device such as a server or desktop computer. Computing system 100 includes a motherboard 105, memory controller 110, bypass module 115, and memory module 120. In some embodiments the memory modules 120 are dual in-line memory module (DIMMs.)

The motherboard 105 can include a printed circuit board (PCB) and two memory module connectors (not shown) mounted to the PCB. Bypass module 115 is plugged into one of the memory module connectors. Memory module 120 is plugged into the other memory module connector.

The memory controller 110 is a circuit that manages the flow of data to and from memory modules via a memory channel 152. The memory controller 110 may be a stand-alone integrated circuit (IC) chip or integrated with other circuits into a single chip. For example, the memory controller 110 an integrated memory controller of a central processing unit (CPU).

Memory module 120 includes a command and address buffer 125 and eighteen memory components 10 attached to a PCB. A memory component 10 may store data using dynamic random access memory (DRAM). In other embodiments the memory component 10 may store data using other techniques such as non-volatile memory (NVRAM). A memory component 10 may be an IC package containing a single integrated circuit die. Alternatively, the memory component 10 can be a stacked memory package that includes individual IC packages stacked together to form a single combined package. A memory component 10 may also be a three-dimensional stacked (3DS) memory package that includes multiple IC dies connected with through silicon vias.

Memory module 120 is shown with two ranks of memory components 10. One rank of memory components 10 includes no shading, and another rank of memory components includes diagonal shading. Each rank of memory components 10 includes nine memory components 10. One rank of memory components 10 can be physically located on the front side of a memory module 120, while another rank of memory components 10 can be physical located on the back side of a memory module 120. In other embodiments two separate ranks may be located in the same side of a memory module 120.

The memory channel 150 represents the communications pathway between the memory controller 110 and the memory components 10. The memory channel 150 can be comprised of conductive signal traces routed on motherboard 110, bypass module 115 and memory module 120. The memory channel 152 is logically divided into a data channel DATA and a primary command and address (C/A) channel $CA_P$.

Primary C/A channel $CA_P$ carries C/A signals transmitted by the memory controller 110 to the memory modules for controlling memory transfers with the memory modules. Primary C/A channel $CA_P$ includes two separate independent C/A sub-channels $CA_{PX}$ and $CA_{PY}$. Each C/A sub-channel carries its own complete set of C/A signals such as chip select (CS), clock enable (CKE), address (ADDR), bank address (BA), bank group (BG), row activate (ACT), row access strobe (RAS), column address strobe (CAS) and on-die termination (ODT) signals, among others. For example, C/A sub-channel $CA_{PX}$ can carry a first set of CS, CKE, ADDR, BA, BG, ACT, RAS, CAS and ODT signals, while C/A sub-channel $CA_{PY}$ can carry a second set of CS, CKE, ADDR, BA, BG, ACT, RAS, CAS and ODT signals.

Data channel DATA carries multiple data signals in parallel between the memory controller 110 and the memory components 10 of the memory module 120. The data channel DATA also carries data strobe signals (DQS) used as timing references for the data signals. DQS signals may be referred to herein as timing reference signals, although timing reference signals are not limited to DQS signals. The DATA channel as shown is 72 bits wide, which includes 64 bits of memory data and 8 bits of error correcting code (ECC) memory data. The DATA channel includes 18 separate data groups DG0-DG17. Each data group DG is 4 bits wide (i.e. a nibble of data) and carries four data signals, and each data group DG also includes a differential DQS signal used as a timing reference for the data signals in that data group DG. In one embodiment, the signal traces for a data group DG can include four traces to carry four single ended data signals, and two traces to carry the differential DQS signal.

The memory controller 110 interacts with memory module 120 via the primary C/A channel $CA_P$ and data channel DATA. The C/A buffer 125 receives primary C/A signals via primary C/A channel $CA_P$, buffers the primary C/A signals and generates secondary C/A signals from the primary C/A signals, and then transmits secondary C/A signals to the memory components 10 via the secondary C/A channel $CA_S$. In an embodiment, the C/A buffer 125 is a registered clock driver (RCD) and is a standalone IC.

In FIG. 1, one of the C/A sub-channels $CA_{PY}$ is directly connected to the C/A buffer 125. The other C/A sub-channel $CA_{PX}$ is directly connected to the bypass module 115. The bypass module 115 includes C/A bypass traces 190 that electrically connect C/A sub-channel $CA_{PX}$ to the memory module 120 via additional traces 192 on the motherboard 105. As a result, both C/A sub-channels $CA_{PX}$ and $CA_{PY}$ are electrically connected to the C/A buffer 125.

The odd data group sub-channels (DG1, DG3, etc) are directly connected to the memory module 120 via traces on the motherboard 105. The even data group sub-channels (DG0, DG2, etc) are directly connected to the bypass module 115. The bypass module 115 includes traces that electrically connect the even data group sub-channels (DG0, DG2,) to the memory module 120 via additional traces on the motherboard 105. As a result, all of the data group sub-channels DG can be used for transferring data between the memory controller 110 and the memory module 120.

In the memory configuration of FIG. 1, during a single memory access operation, each memory component 10 transfers 8 bit wide data across two data group sub-channels. Four data bits (e.g. a data nibble) are transferred in parallel across an odd data group sub-channel such as DG0, and four data bits are transferred in parallel across an even data group sub-channel such as DG1. The data has a burst length of eight. This results in a total of 64 bits of data (8×8) being transferred with a single memory component 10 in a single memory access operation. A memory access operation can include either a memory read operation during which the memory controller 110 reads data from the memory components 10, or a memory write operation during which the memory controller 110 writes data to the memory components 10. A single memory access operation can include the activation of a bank and row of memory, followed by a read or write command specifying a column of the memory, followed by a transfer of data associated with the column.

Figure 2:
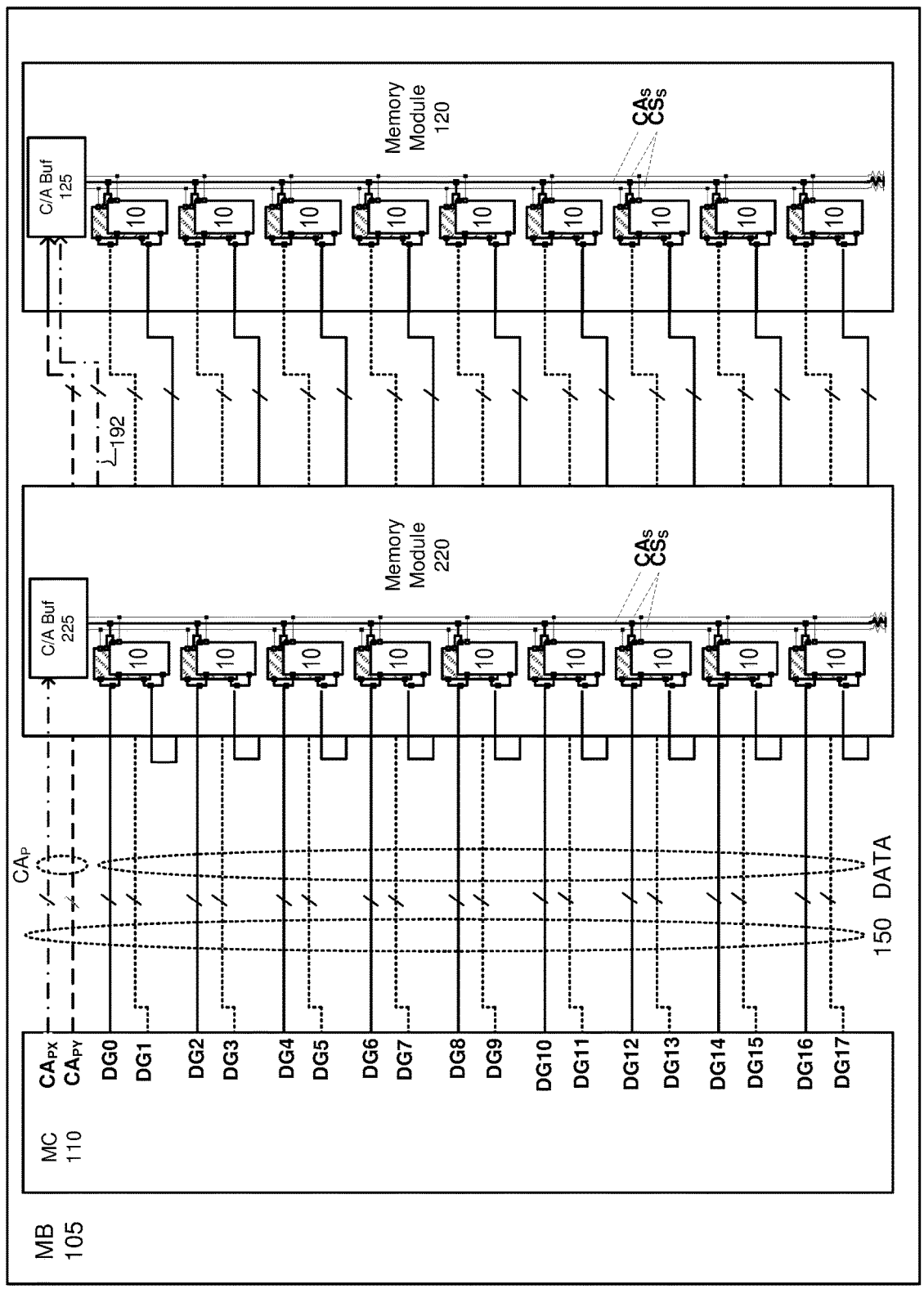
FIG. 2 is a computing system with two memory modules, according to an embodiment.

Referring to FIG. 2, illustrated is a computing system with two memory modules. The computing system now includes an additional memory module 220 in place of the bypass module 115 from FIG. 1. As a result, the even data group sub-channels (DG0, DG2, etc) are now directly connected to the memory components 10 of memory module 220 and are used to transfer data with the last memory module 220. The odd data group sub-channels (DG1, DG3, etc) are still connected to the last memory module 120 and are used for transferring data with the last memory module 120. The even data group sub-channels (DG0, DG2, etc) are not used to transfer data with the last memory module 120.

Also, the C/A buffer 225 of the added memory module 220 is connected to one C/A sub-channel $CA_{PX}$. C/A buffer 125 is only connected to a single sub-channel $CA_{PY}$. because traces 192 are not used to carry any signals in this configuration.

In a single memory access operation, a memory component 10 transfers 4 bit wide data across a single data group sub-channel DG. Memory components 10 of the added memory module 220 transfer data across even data group sub-channels (e.g. DG0, DG2). Memory components 10 of the last module 120 transfer data across odd data group sub-channels (e.g. DG1, DG3). The data is transferred with a burst length of sixteen. This results in a total of 64 bits of data (4×16) being transferred with a single memory component 10 in a single memory access operation.

Because each memory component supports both a full bit width mode, and a reduced bit width mode, it enables the same memory module to be used in either the memory configuration of FIG. 1 or the memory configuration of FIG. 2. Additionally, by adjusting the burst length depending on whether the memory component is in full bit width mode or reduced bit width mode, the same amount of data can be transferred with a memory component 10 in a single memory operation regardless of the selected bit width mode.

In one embodiment, the memory module 120 described herein can also be used in a multi-drop memory system, as opposed to the point to point memory system of FIG. 1 and FIG. 2. In a multi-drop memory system, both C/A channel sub-channels $CA_{PX}$ and $CA_{PY}$ are connected to multiple memory module connectors of the motherboard in a multi-drop configuration. Additionally, each data group sub-channel would be directly connected to multiple memory module connectors of the motherboard in a multi-drop configuration. When used in a multi-drop memory system, the memory components may transfer data in full bit width mode or reduced bit width mode, depending on the configuration of the system. The memory module 120 thus has a design that allows it to be used for several different memory system topologies.

In one embodiment, when the system is first powered on, the memory controller 110 determines the configuration of memory modules that are plugged into the motherboard 105. Once the configuration is determined, the memory controller 110 transmits a data width setting to the memory modules that configures the memory components 120 to operate either in full bit width mode or reduced bit width mode. The data width setting can be transmitted as a command via the primary $CA_P$ channel or via a separate sideband signal. The C/A buffers 125 and 225 receive the data width setting and forward the data width setting to the memory components 10 via a secondary C/A channel $CA_S$ of a memory module 120.

Figure 3:
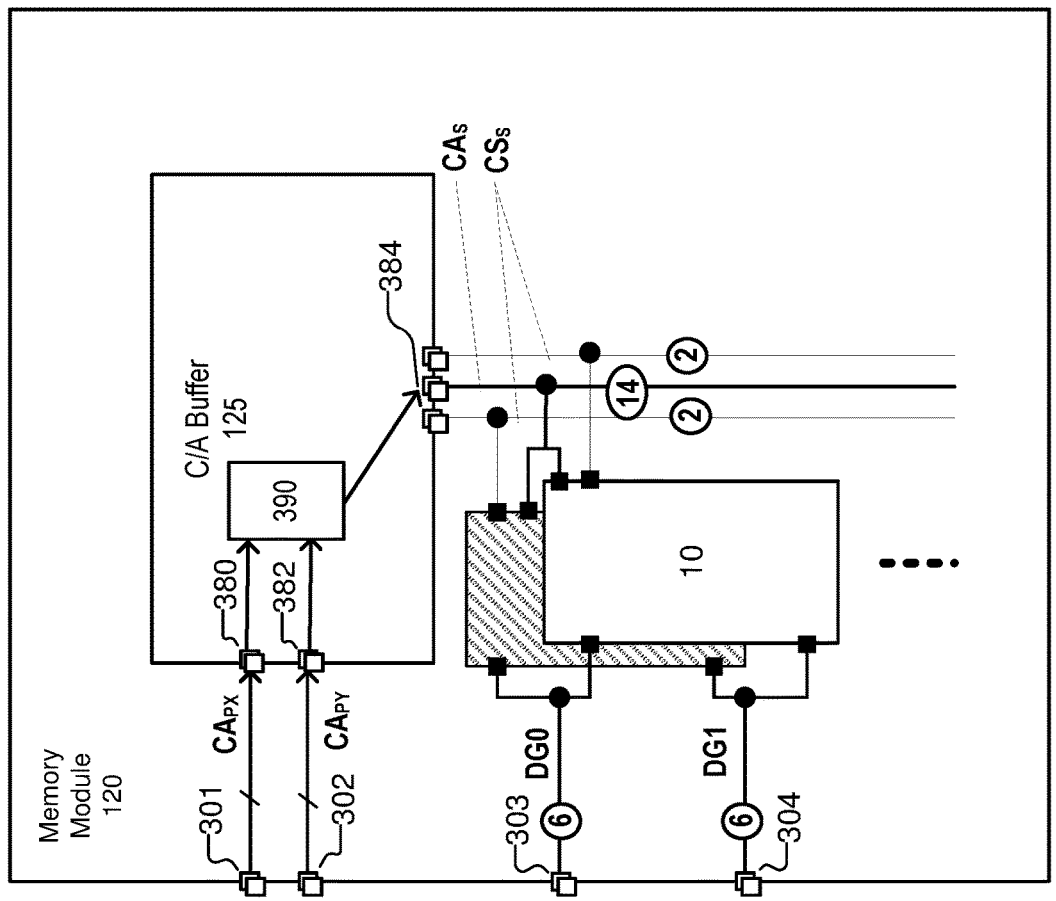
FIG. 3 is a diagram of a memory module, according to an embodiment.

FIG. 3 is a diagram of a memory module 120, according to an embodiment. The memory module 120 includes a C/A buffer 125, memory components 10, address ports 301 and 302, and data ports 303 and 304. The ports 301-304 can be conductive pins used to make a physical and electrical connection between the memory module 120 and memory module connectors of the motherboard 105.

The C/A buffer 125 includes one set of primary address ports 380 for coupling to one C/A subchannel $CA_{PX}$ and another set of primary address ports 382 for coupling to the other C/A subchannel $CA_{PY}$. The C/A buffer 125 also includes secondary address ports 384 for coupling to the secondary C/A channel $CA_S$. Ports 380, 382, and 384 can be external connection points used to make physical and electrical connections to the C/A sub-channels. Examples of these ports are IC pins or pads.

The secondary C/A channel $CA_S$ can also include chip select signals $CS_S$, which are shown as separate traces in FIG. 3. One set of chip select signals $CS_S$ is connected to one memory rank, and another set of chip select signals $CS_S$ is connected to another memory rank. The C/A buffer 125 can send secondary C/A signals to the memory components 10 via the secondary C/A channel $CA_S$ in order to control operation of the memory components 10.

In one embodiment, the C/A buffer 125 includes address steering capabilities. The C/A buffer 125 can include an address steering circuit 390 that selects primary C/A signals from one of the two primary C/A sub-channels $CA_{PX}$ and $CA_{PY}$, and routes these signals to the secondary C/A channel $CA_S$ via the secondary address ports 384. As an example, the address steering circuit 390 can include a multiplexer having inputs coupled to primary C/A input ports 380 and 382 and an output coupled to secondary C/A output ports 384, and that selectively routes C/A signals between a selected set of input ports 308 and 382 to the output ports 384. The address steering can be statically configured when the system is powered on based on an address channel selection command received at the C/A buffer 125 from the memory controller 10 via the primary C/A channel or a sideband channel (not shown).

Each memory component 10 is electrically connected to both the data ports 303 for an even data group sub-channel (e.g. DG0) and the data ports 304 for an odd data group sub-channel (e.g. DG1). The details of a memory component 10 are now described by reference to FIG. 4.

Figure 4:
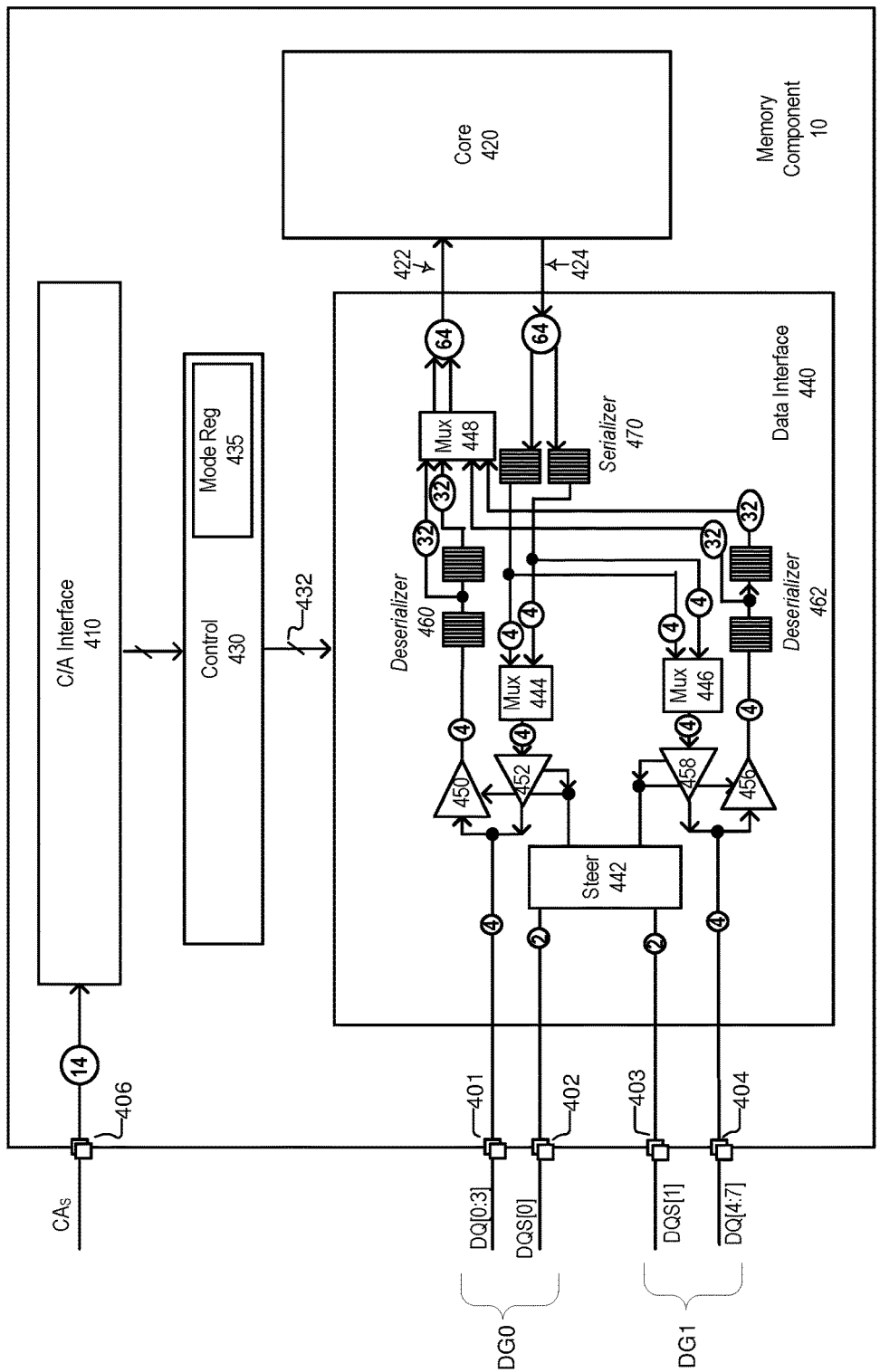
FIG. 4 is a diagram of a memory component, according to an embodiment.

FIG. 4 is a diagram of a memory component 10, according to an embodiment. The memory component 10 includes a C/A interface circuit 410, memory core 420, a data interface circuit 440, a control circuit 430, C/A ports 406 and data ports 401-404.

Address ports 406 represent external connection points for making physical and electrical connections to the secondary C/A channel $CA_S$. Data ports 401-404 represent external connection points for making physical and electrical connections to the data group sub-channels DG of the data channel DATA. Example of these ports can be IC pins or pads. Data ports 401 are for data signals DQ[0:3]. Data ports 402 are for the DQS signal DQS[0] that is a timing reference for the data signals DQ[0:3]. Data ports 404 are for data signals DQ[4:7]. Data ports 403 are for the DQS signal DQS[1] that is a timing reference for the data signals DQ[4:7]. In FIG. 4, memory component 10 is shown as being coupled to data group sub-channels DG0 and DG1 for ease of explanation only. The other memory components 10 connected to the other data group sub-channels DG can include the same circuitry as that shown in FIG. 4.

C/A interface 410 receives C/A signals from the secondary C/A channel $CA_S$ via the C/A ports 406. The C/A signals can include commands such as memory access commands and data width settings. The C/A interface 410 passes the commands on to the control circuit 430. The control circuit 430 controls operation of the data interface 440 and other circuits of the memory component 10 in response to the commands.

In one embodiment, the control circuit 430 can detect a data width setting that indicates whether the memory component 10 is to operate in a full bit width mode or reduced bit width mode. The data width setting can also indicate which of the two memory group sub-channels DG should be used for data transfer during reduced bit width mode. The control circuit 430 then stores this data width setting into a mode register circuit 435. The mode register circuit 435 can be programmed one time when the system is first powered on. The setting stored in the mode register circuit 435 controls how the interface control signals 432 are generated, which affects the routing of data through the data interface 440 according to the selected data width mode, as will be described herein.

The memory core 420 includes data storage cells for storing data. The memory core 420 can include several memory banks, and each bank has an array of individual storage cells organized into rows and columns. In one embodiment, the storage cells can include dynamic random access memory (DRAM) or non-volatile memory (NVRAM).

The data interface 440 is an interface circuit that transfers data between the data ports 404 and the memory core 420 during memory access operations. The memory access operations can include read operations during which data is read from the memory core 420 and transmitted across the data group sub-channels DG. The memory access operations can also include write operations during which data is received via the data group sub-channels DG and written to the memory core 420.

The data interface 440 can operate in different data width modes supporting different bit widths. In a full bit width mode the data interface 440 uses both data group sub-channels DG0 or DG1 to transfer eight bit wide data with a burst length of eight (8×8). In a reduced bit width mode, the data interface 440 uses only one of the data group sub-channels DG0 or DG1 to transfer four bit wide data with a burst length of sixteen (4×16), while the other data group sub-channel goes unused.

Thus, the bit width (8 bits) of data transferred during full bit width mode is greater than the bit width (4 bits) of data transferred during reduced bit width mode. The burst length (8) during the full bit width mode is shorter than the burst length (16) in the reduced bit width mode. In both modes, 64 bits of data are transferred in a single burst of a memory access operation (8 bits×8 burst length=4 bits×16 burst length=64 bits).

Memory access operations (e.g. read and write) in a memory system are burst oriented. The burst length can correspond to the number of consecutive data units that are transferred in a single memory access operation. Each data unit is timed by an edge transition of a corresponding data strobe signal associated with the data unit.

Figure 9:
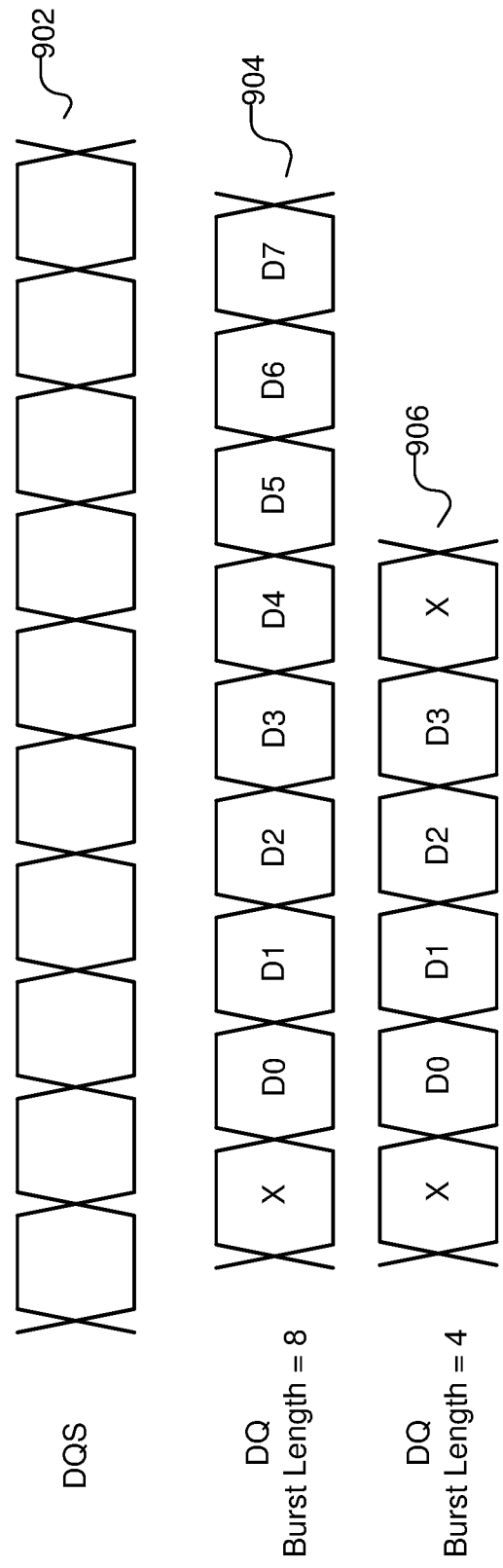
FIG. 9 is a timing diagram illustrating different burst length memory access operations, according to an embodiment.

Referring briefly to FIG. 9, illustrated is a timing diagram of different burst lengths, according to an embodiment. The first waveform 902 represents a differential data strobe signal DQS. The second waveform 904 represents data transferred with a burst length of eight. When the burst length is eight, eight consecutive units of data D0-D7 are transferred over eight consecutive edges of the data strobe signal DQS. No valid data is transferred at the edge of data strobe signal that immediately precedes the data burst, and no valid data is transferred at the edge of the data strobe signal that immediately follows the data burst.

The third waveform 906 represents data transferred with a burst length of four. When the burst length is four, only four consecutive units of data D0-D3 are transferred over four consecutive edges of the data strobe signal DQS. No valid data is transferred at the edge of data strobe signal that immediately precedes the data burst, and no valid data is transferred at the edge of the data strobe signal that immediately follows the data burst.

In FIG. 9, the data signals DQ are center aligned with the data strobe DQS signal. In other embodiments the data signals DQ may be edge aligned with the DQS signal instead of being center aligned. In either situation, the data strobe DQS signal serves as a timing reference that is transferred along with the corresponding data signals DQ.

Referring back to FIG. 4, the data interface 440 writes data to and reads data from the memory core 420 via a 64 bit wide data path 422, and reads data from the memory core 420 via a 64 bit wide data path 424. Each of the 64 bit wide data paths 422 and 424 has a bit width that is wider than the 8 bit width of the full bit width mode or the 4 bit width of the reduced bit width mode.

Regardless of whether the data width mode is a full bit width mode or a reduced bit width mode, the data is still written from the data interface 440 to the core 420 along the same 64 bit wide data path 422. In full bit width mode, the data from both via both data group subchannels DG0 and DG1 is combined and stored into the memory core 420 via 64 bit wide data path 422. In reduced bit width mode, the data is received from a selected one of data group subchannel DG0 or data group subchannel DG1, and subsequently stored into the memory core 420 via 64 bit wide data path 422.

Similarly, regardless of whether the data width mode is a full bit width mode or a reduced bit width mode, the data is still read from the core 420 along the same 64 bit wide data path 424. In full bit width mode, 64 bits of data are read from the memory core 420, and this data is transmitted via both of the data group subchannels DG0 and DG1. In reduced bit width mode, 64 bits of data are read from the memory core 420, and this data is transmitted via only a selected one of the data group subchannels DG0 and DG1.

As shown, the data interface 440 includes several circuits that can be configured to direct the flow of data between the data group subchannels DG0 and DG1 and the memory core 420 to support different modes of operation. The circuits include DQS steering circuit 442, data receiver (RX) interface circuits 450 and 456, data transmitter (TX) interface circuits 452 and 458, multiplexers 444, 446 and 448, deserializers 460 and 462, and serializer 470.

The write path for memory write operation is now described. During a memory write operation, steering circuit 442 can steer any of the received DQS signals DQS[0] or DQS[1] to any of the RX interface circuits 450 and 456. The RX interface 450 has an input coupled to data ports 401. The RX interface 450 receives and samples data signals DQ[0:3] at edges of a DQS signal received from steering circuit 442. The RX interface 456 has an input coupled to data ports 404. The RX interface 456 receives and samples data signals DQ[4:7] at edges of a DQS signal received from steering circuit 442. For example, the RX interfaces 450 and 456 may include latch circuits having a clock input that receives a corresponding DQS signal from the steering circuit 442.

The deserializer 460 has an input that is coupled to the output of the TX interface 450. The deserializer 460 receives a 4 bit wide data stream from the RX interface 450 and deserializes the 4 bit wide data stream into either 32 bit wide data or two pieces of 32 bit wide data. The deserializer 462 has an input that is coupled to the output of the TX interface 456. The deserializer 462 receives a 4 bit wide data stream from RX interface 456 and deserializes the 4 bit wide data stream into either 32 bit wide data or two pieces of 32 bit wide data.

MUX 448 includes four 32 bit wide data inputs. Two of the MUX inputs are coupled to the output of the deserializer 460. Two of the MUX inputs are coupled to the output of the deserializer 462. An output of the MUX is coupled to the 64 bit wide data path 422. MUX selects two of its two 32 bit wide data inputs to output onto the 64 bit wide data path 422 to the memory core 420.

The read path for memory read operations is now described. Starting at the memory core 420, the memory core 420 outputs read data onto the 64 bit wide data path 424. The serializer 470 has an input coupled to the 64 bit width data path 424 and receives data from the memory core 420 via a 64 bit wide data path 424. Serializer serializes the 64 bit wide data into two 4 bit wide data streams. Both 4 bit wide data streams are provided to both multiplexers 444 and 446.

Both multiplexers 444 and 446 have inputs that are coupled to the output of the serializer 470. Multiplexer 444 selects one of its two input 4 bit data streams to output to the TX interface 452. Multiplexer 446 selects one of its two input 4 bit data streams to output to the TX interface 458.

TX interface 452 has an input that is coupled to an output of the multiplexer 444. TX interface 452 outputs the 4 bit wide data from the multiplexer 444 as data signals DQ[0:3]. The TX interface 452 outputs the data at a timing controlled by edges of an internally generated DQS signal. TX interface 458 has an input that is coupled to an output of the multiplexer 446. TX interface 458 outputs the 4 bit wide data from the multiplexer 446 as data signals DQ[4:7].

The TX interface 452 outputs 4 bit wide data at a timing controlled by edges of an internally generated DQS signal. Similarly, the TX interface 458 outputs 4 bit wide data at a timing controlled by edges of an internally generated DQS signal. For example, the TX interfaces 452 and 458 may include latch circuits having a clock input that receive the internally generated DQS signals. Steering circuit 442 can select one or both of the internally generated DQS signals from the TX interfaces 452 and 458 to transmit across the data group sub-channels as DQS[0] and DQS W.

As shown in FIG. 4, there are two separate independent deserializers 460 and 462 for the write path, but only one serializer 470 for the read path. This is because RX interface 450 and RX interface 456 can operate in two different timing domains if they use different DQS signals to receive data. As a result, the 4 bit wide data stream output from RX interface 450 may be skewed relative to the 4 bit wide data stream output from RX interface 456. The independent deserializers 460 and 462 can absorb this timing skew before it reaches the memory core 420.

By contrast, in the read path, there is only a single serializer 470 shared by the two 4-bit TX interfaces 452 and 458. There is no need for two separate serializers because the DQS signals used as timing references by the data interfaces 452 are internally generated and are substantially phase aligned with each other.

The circuits of the data interface 440 may be controlled to operate differently in different modes in accordance with the interface control signals 432 received from the control circuit 430. For example, the control signals 432 can control selections made by the multiplexers 446, 446 and 448 and operations of the de-serializer 460 and 462 and serializer 470, as will be explained herein. In some embodiments, the steering configuration of the steering circuit 442 is also controlled by the control signals 432. Memory reads and memory writes at different bit widths is now explained by reference to FIGS. 5, 6, 7 and 8.

Figure 5:
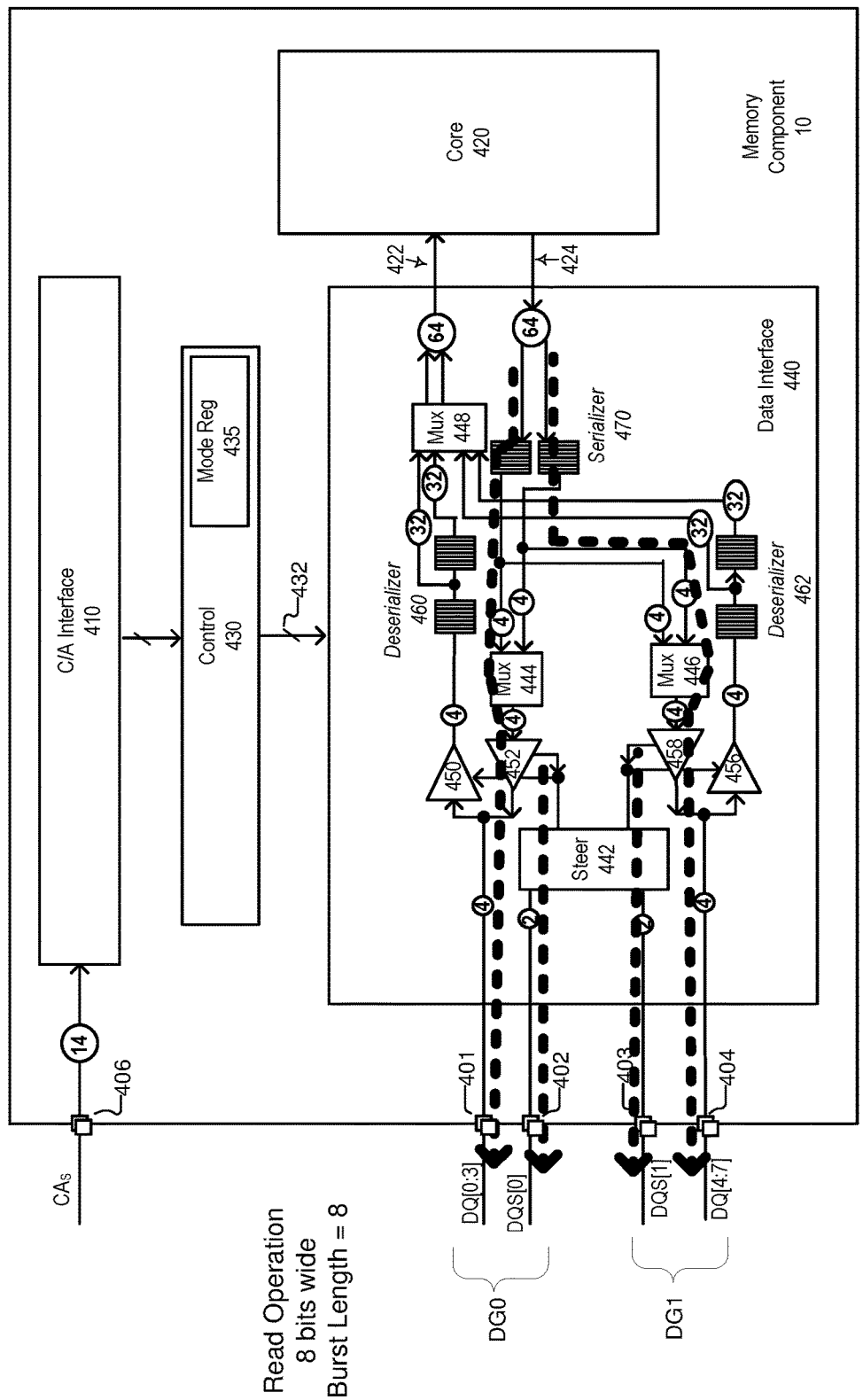
FIG. 5 is the memory component of FIG. 4 which has been annotated to show signaling flow through a data interface during a full bit width read operation, according to an embodiment.

FIG. 5 is the memory component 10 of FIG. 4 which has been annotated to show signaling flow through a data interface 440 during a full bit width read operation, according to an embodiment. During the memory read operation, 64 bits of data are read from the memory core 420. Serializer 470 serializes the 64 bit data into two 4 bit data streams. MUX 444 selects the upper 4 bit data stream output by the serializer 470 and MUX 446 selects the lower 4 bit data stream output by the serializer 470.

TX interface 452 outputs the 4 bit wide data from MUX 444 as data signals DQ[0:3] via data ports 401 at a timing controlled by edges of an internally generated DQS signal. Steering circuit 442 selects the DQS signal from TX interface 452 to output as DQS signal DQS[0] via data ports 402. TX interface 458 outputs the 4 bit wide data from MUX 446 as data signals DQ[4:7] via data ports 404 at a timing controlled by edges of an internally generated DQS signal. Steering circuit 442 selects the DQS signal from TX interface 458 to output as DQS signal DQS[1] via data ports 403.

To transmit all 64 bits of data read from the memory core 420, the burst length of the read operation is 8. Thus, 4 bit wide data is output across data group sub-channel DG0 over 8 consecutive edges of DQS signal DQS[0]. 4 bit wide data is output across data group sub-channels DG1 over 8 consecutive edges of DQS signal DQS[1]. DQS[0] serves as the timing reference for data signals DQ[0:3], and DQS[1] serves as the timing reference for data signals DQ[4:7].

Figure 6:
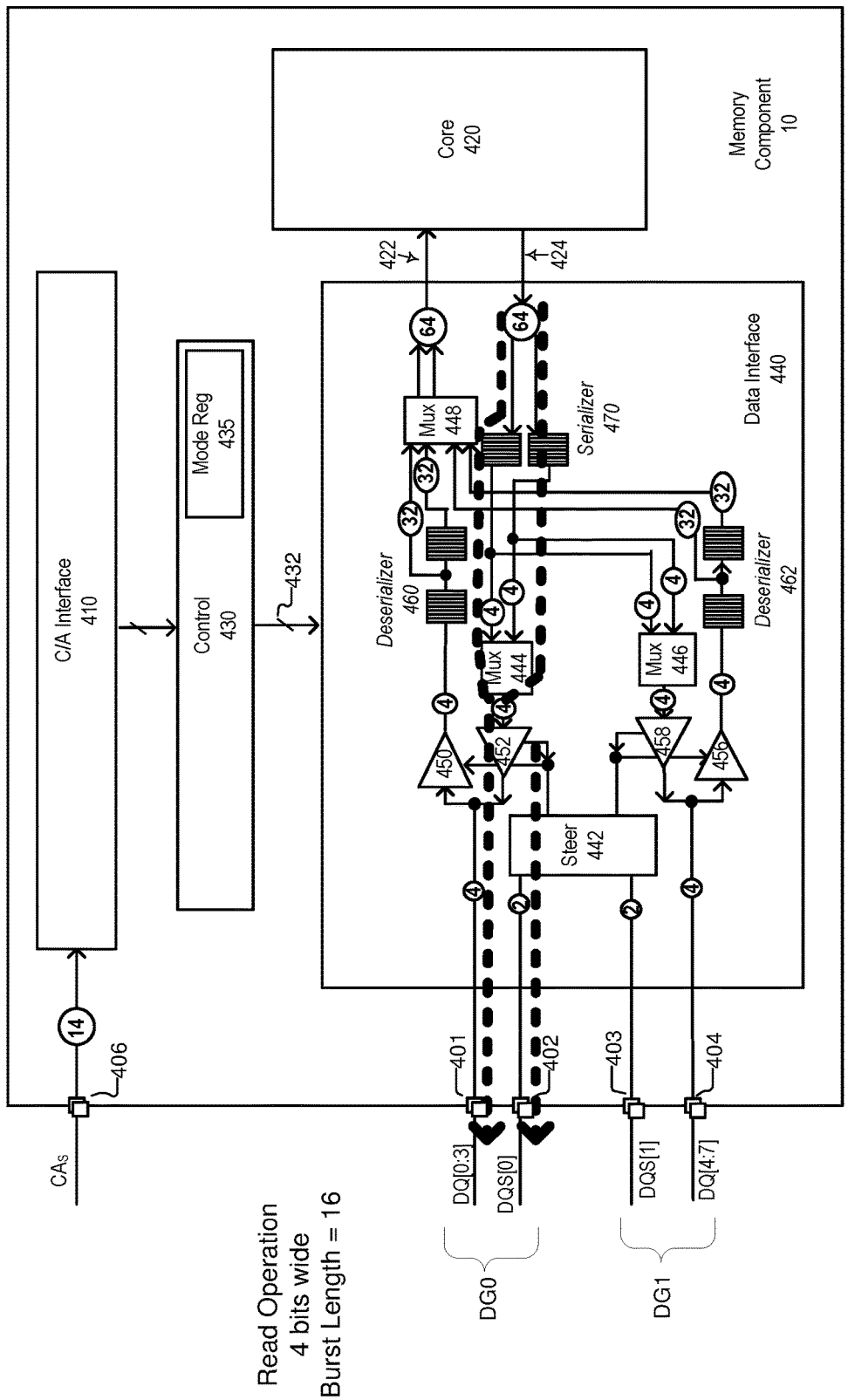
FIG. 6 is the memory component of FIG. 4 which has been annotated to show signaling flow through a data interface during a reduced bit width read operation, according to an embodiment.

FIG. 6 is the memory component 10 of FIG. 4 which has been annotated to show signaling flow through a data interface 440 during a reduced bit width read operation, according to an embodiment. During the memory read operation, 64 bits of data are read from the memory core 420. Serializer 470 serializes the 64 bit data into two 4 bit data streams.

Serializer 470 delays the data streams relative to one another such that the upper 4 bit data stream is output before the lower 4 bit data stream is output. MUX 444 routes both of the 4 bit data streams to its output. The MUX first selects the upper 4 bit data stream output by the serializer 470 while the upper 4 bit data stream is being output. At a later point in time, MUX 446 then selects the lower 4 bit data stream output by the serializer 470.

TX interface 452 outputs the 4 bit wide data from MUX 444 as data signals DQ[0:3] at a timing controlled by edges of an internally generated DQS signal. Steering circuit 442 selects the DQS signal from TX interface 452 to output as DQS signal DQS[0]. TX interface 458 does not output any data and the data group sub-channel DG1 is thus not used for transferring data.

To transmit all 64 bits of data read from the memory core 420, the burst length of the read operation is 16. Thus, 4 bit wide data is output across data group sub-channel DG0 over 16 consecutive edges of DQS signal DQS[0]. DQS[0] serves as the timing reference for data signals DQ[0:3]. Data signals DQ[4:7] and data strobe signal DQS[1] is not used. In other embodiments, 4 bit wide data may be output across data group sub-channel DG1 while data group sub-channel DG0 goes unused.

Figure 7:
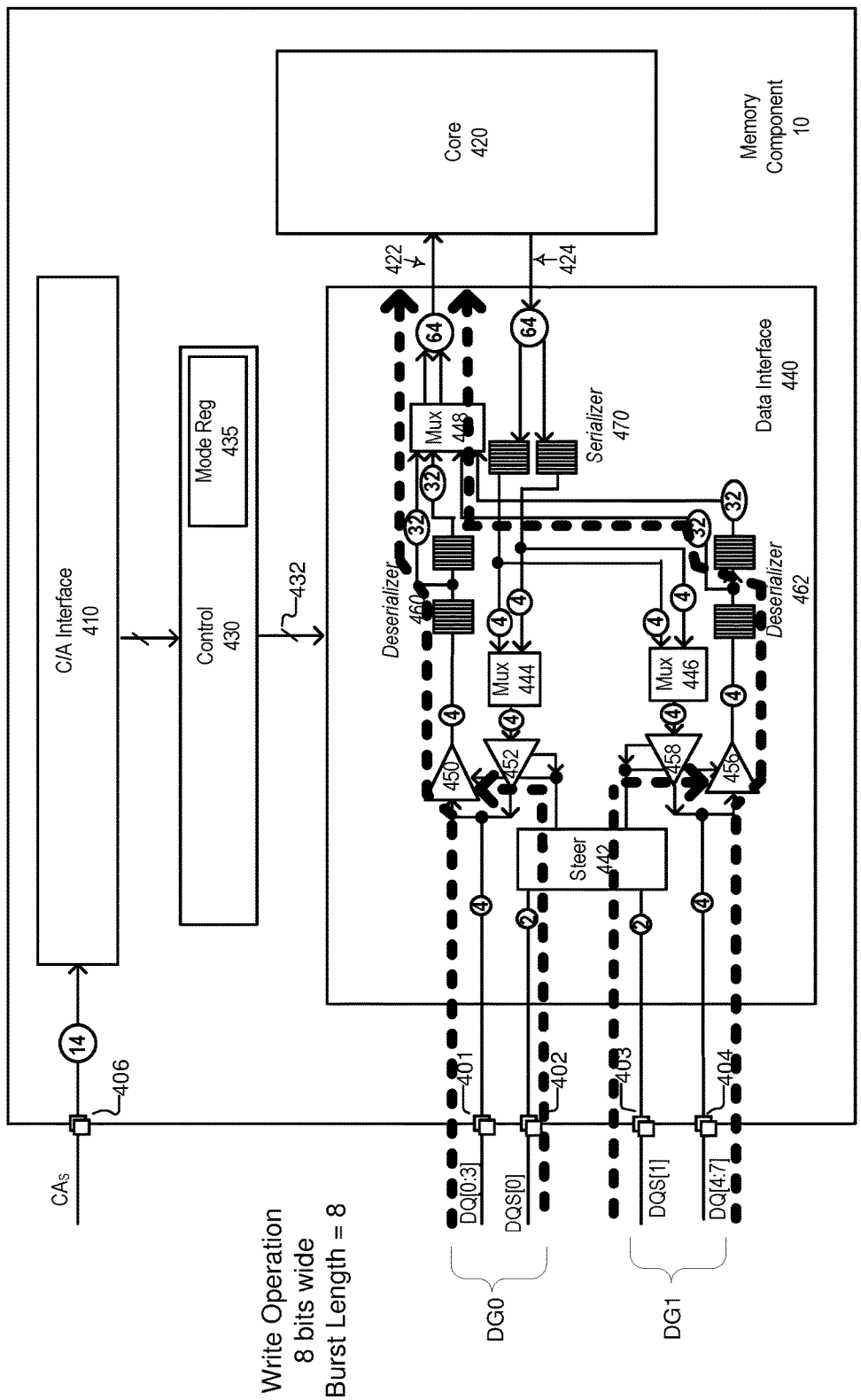
FIG. 7 is the memory component of FIG. 4 which has been annotated to show signaling flow through a data interface during a full bit width write operation, according to an embodiment.

FIG. 7 is the memory component 10 of FIG. 4 which has been annotated to show signaling flow through a data interface 440 during a full bit width write operation, according to an embodiment. During the memory write operation, 8 bit wide data is received by the data interface 440 from the data groups sub-channels DG0 and DG1 via the data ports 404.

Specifically, RX interface 450 receives 4 bit wide data in the form of data signals DQ[0:3]. Steering circuit 442 passes data strobe signal DQS[0] to the RX interface 450 and the RX interface 450 uses DQS[0] as a timing reference in reading the data signals DQ[0:3]. RX interface 456 receives 4 bit wide data in the form of data signals DQ[4:7]. Steering circuit 442 passes data strobe signal DQS[1] to the RX interface 456 and the RX interface 456 uses DQS[1] as a timing reference in reading the data signals DQ[4:7].

To receive 64 bits of data, the burst length of the read operation is 8 bits long. Thus, 4 bit wide data is received across data group sub-channel DG0 over 8 consecutive edges of DQS signal DQS[0]. 4 bit wide data is received across data group sub-channel DG1 over 8 consecutive edges of DQS signal DQS[1]. DQS[0] serves as the timing reference for data signals DQ[0:3] and DQS[1] serves as the timing reference for data signals DQ[4:7].

Deserializer 460 receives the 4 bit wide data from RX interface 450 and deserializes the data into 32 bit wide data. Deserializer 462 receives the 4 bit wide data from the RX interface 456 and deserializes the data into 32 bit wide data. The MUX 448 selects both 32 bit wide data outputs from the deserializers 460 and 462 to output onto the 64 bit data path 422 to the memory core 420.

Figure 8:
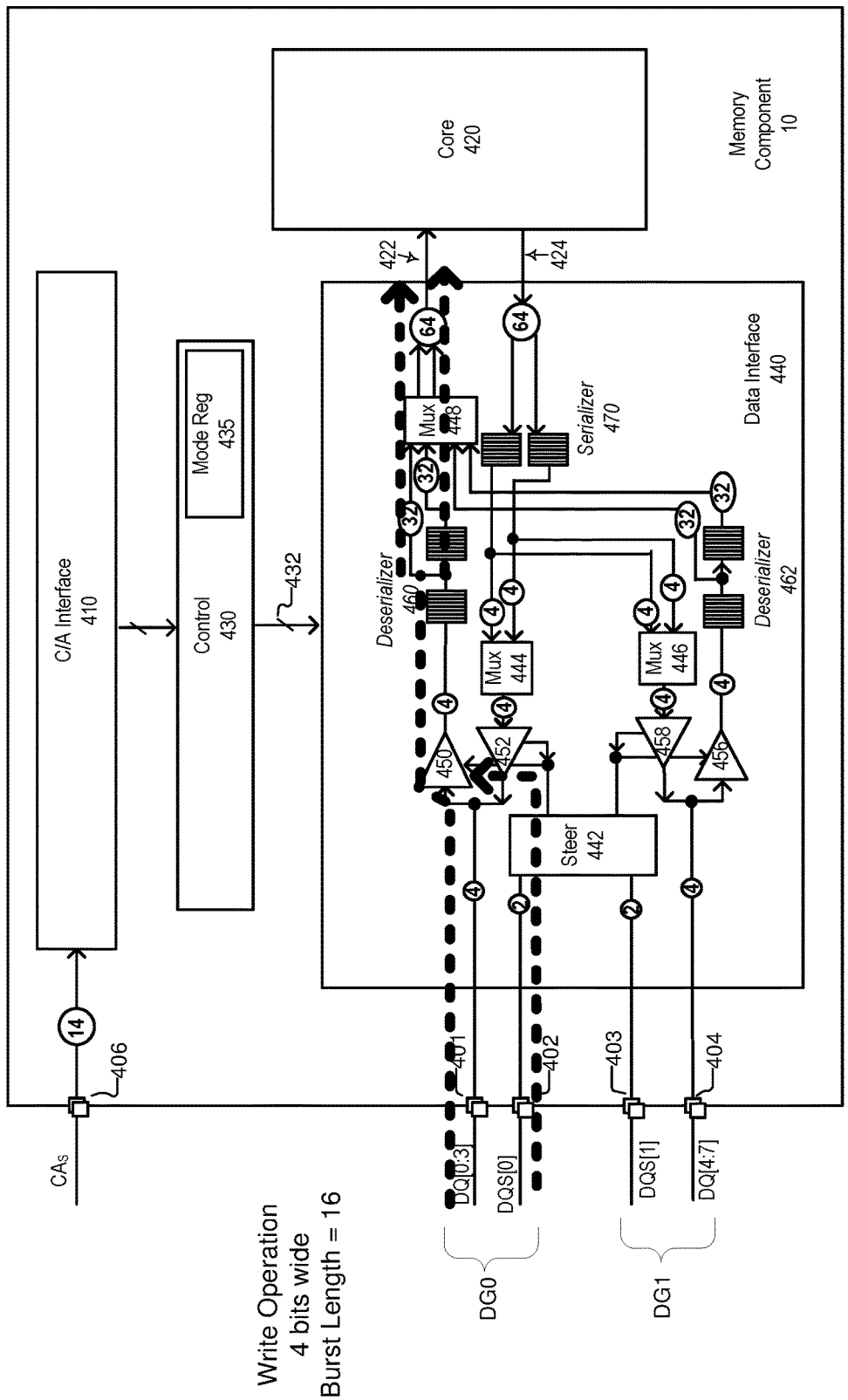
FIG. 8 is the memory component of FIG. 4 which has been annotated to show signaling flow through a data interface during a reduced bit width read operation, according to an embodiment.

FIG. 8 is the memory component 10 of FIG. 4 which has been annotated to show signaling flow through a data interface 440 during a reduced bit width read operation, according to an embodiment. During the memory write operation, 4 bit wide data is received by the data interface 440 from the data group sub-channel DG0 via the data ports 404. Data group sub-channel DG1 is not used and no data is received via data group sub-channel DG1.

Specifically, RX interface 450 receives 4 bit wide data in the form of data signals DQ[0:3]. Steering circuit 442 passes data strobe signal DQS[0] to the RX interface 450 and the RX interface 450 uses DQS[0] as a timing reference in reading the data signals DQ[0:3]. RX interface 456 is not used.

To receive 64 bits of data, the burst length of the read operation is 16. Thus, 4 bit wide data is received across data group sub-channel DG0 over 16 consecutive edges of DQS signal DQS[0]. DQS[0] serves as the timing reference for data signals DQ[0:3].

Deserializer 460 receives the 4 bit wide data from RX interface 450 and deserializes the data into two separate pieces of 32 bit wide data. The MUX 448 selects both 32 bit wide data outputs from the deserializer 460 to output onto the 64 bit data path 422 to the memory core 420.

Figure 10:
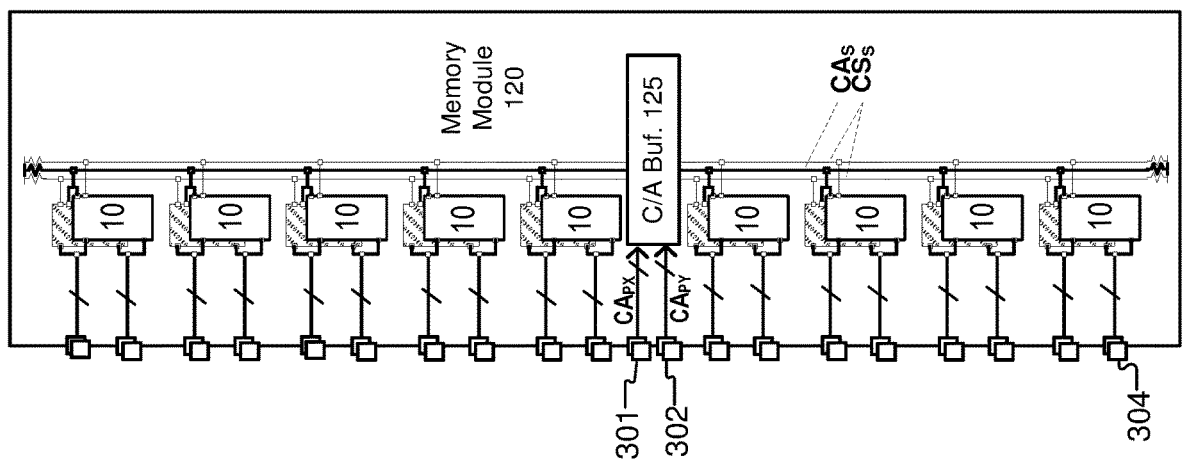
FIG. 10 illustrates a memory module according to another embodiment.

FIG. 10 illustrates a memory module 120 according to another embodiment. The memory module 120 of FIG. 10 is similar to the one from FIG. 3, but now includes a C/A buffer 125 near the center of the memory module 120 instead of at the edge of the memory module 120.

In the different memory access operations shown in FIG. 5-8, the steering circuit 442 configuration was fixed and did not change. In some embodiments, the steering capabilities of the steering circuit 442 can be used to support additional types of memory systems. For example, in some memory configurations, the steering circuit 442 can route a single DQS signal, such as DQS[0], to both of the RX interfaces 450 and 456. This allows a single DQS signal to be used as the timing reference for the data signals of two data group sub-channels DG0 and DG1.

In one embodiment, a memory module comprises an address buffer circuit, a command/address channel, and a plurality of memory components controlled by the address buffer circuit via the command/address channel. At least one memory component is an integrated circuit package that comprises a plurality of data ports, a memory core to store data, and a data interface. The data interface is capable of transferring data between the memory core and the data ports. The data interface supports a first data width mode in which the data interface transfers data at a first bit width and a first burst length via the data ports. The data interface also supports a second data width mode in which the data interface transfers data at a second bit width and second burst length via the data ports. The first bit width is greater than the second bit width and the first burst length is shorter than the second burst length.

Upon reading this disclosure, those of skill in the art may appreciate still additional alternative designs for a multimode memory module and memory component. Thus, while particular embodiments and applications have been illustrated and described herein, it is to be understood that the disclosure is not limited to the precise construction and components disclosed herein. Various modifications, changes and variations which may be apparent to those skilled in the art may be made in the arrangement, operation and details of the method and apparatus disclosed herein without departing from the spirit and scope of the disclosure as defined in the appended claims.

What is claimed is:

1. A memory module comprising:
    an address buffer circuit;
    a command/address channel; and
    a memory rank controlled by the address buffer circuit via the command/address channel, the memory rank including a plurality of memory components where each memory component comprises:
        a respective plurality of memory component data ports;
        a respective memory core to store data; and
        a respective data interface to transfer data between the respective memory core and the respective plurality of memory component data ports, the respective data interface supporting a first data width mode in which the respective data interface transfers data at a first bit width and a first burst length via a first set of the respective plurality of memory component data ports, the respective data interface supporting a second data width mode in which the respective data interface transfers data at a second bit width and a second burst length via a second set of the respective plurality of memory component data ports; and
    a respective data path between the respective data interface and the respective memory core, the respective data path having a third bit width that is greater than the first bit width of the first data width mode and the second bit width of the second data width mode;
    a plurality of memory module data pins to transfer the data between the plurality of memory component data ports and a memory controller.

2. The memory module of claim 1, wherein in both the first data width mode and the second data width mode, the data interface writes data to the memory core via the data path.

3. The memory module of claim 1, wherein in both the first data width mode and the second data width mode, the data interface reads data from the memory core via the data path.

4. The memory module of claim 1, wherein the second set of the plurality of memory component data ports has less memory component data ports than the first set of the plurality of memory component data ports.

5. The memory module of claim 1, wherein the first bit width is greater than the second bit width and the first burst length is shorter than the second burst length.

6. The memory module of claim 5, wherein a product of the first bit width and the first burst length is equal to a product of the second bit width and the second burst length.

7. The memory module of claim 6, wherein the first bit width is eight bits and the first burst length is eight, and the second bit width is four bits and the second burst length is sixteen.

8. The memory module of claim 1, wherein the first set of the plurality of memory component data ports include first memory component data ports and second memory component data ports, and in the first data width mode the data interface transfers the data via the first memory component data ports and the second memory component data ports, and in the second data width mode the data interface transfers the data via the second set of the plurality of memory component data ports that includes the first memory component data ports but not the second memory component data ports.

9. The memory module of claim 1, wherein:
    in a memory read operation of the first data width mode, the data interface is to transmit a first timing reference signal associated with a first portion of the first bit width, and is to transmit a second timing reference signal associated with a second portion of the first bit width; and
    in a memory read operation of the second data width mode, the data interface is to transmit a timing reference signal associated with all bits of the second bit width.

10. The memory module of claim 1, wherein the at least one memory component comprises a mode register to store a setting indicative of a data transfer width, and the data interface operates in the first data width mode or the second data width mode depending on the setting stored in the mode register.

11. The memory module of claim 1, wherein the plurality of memory component data ports included in the at least one memory component are shared with another memory component from the plurality of memory components.

* * * * *